W. N. GOODWIN.
LOCK FOR VEHICLE TONGUES.
APPLICATION FILED JAN. 21, 1908.
906,525.
Patented Dec. 15, 1908.
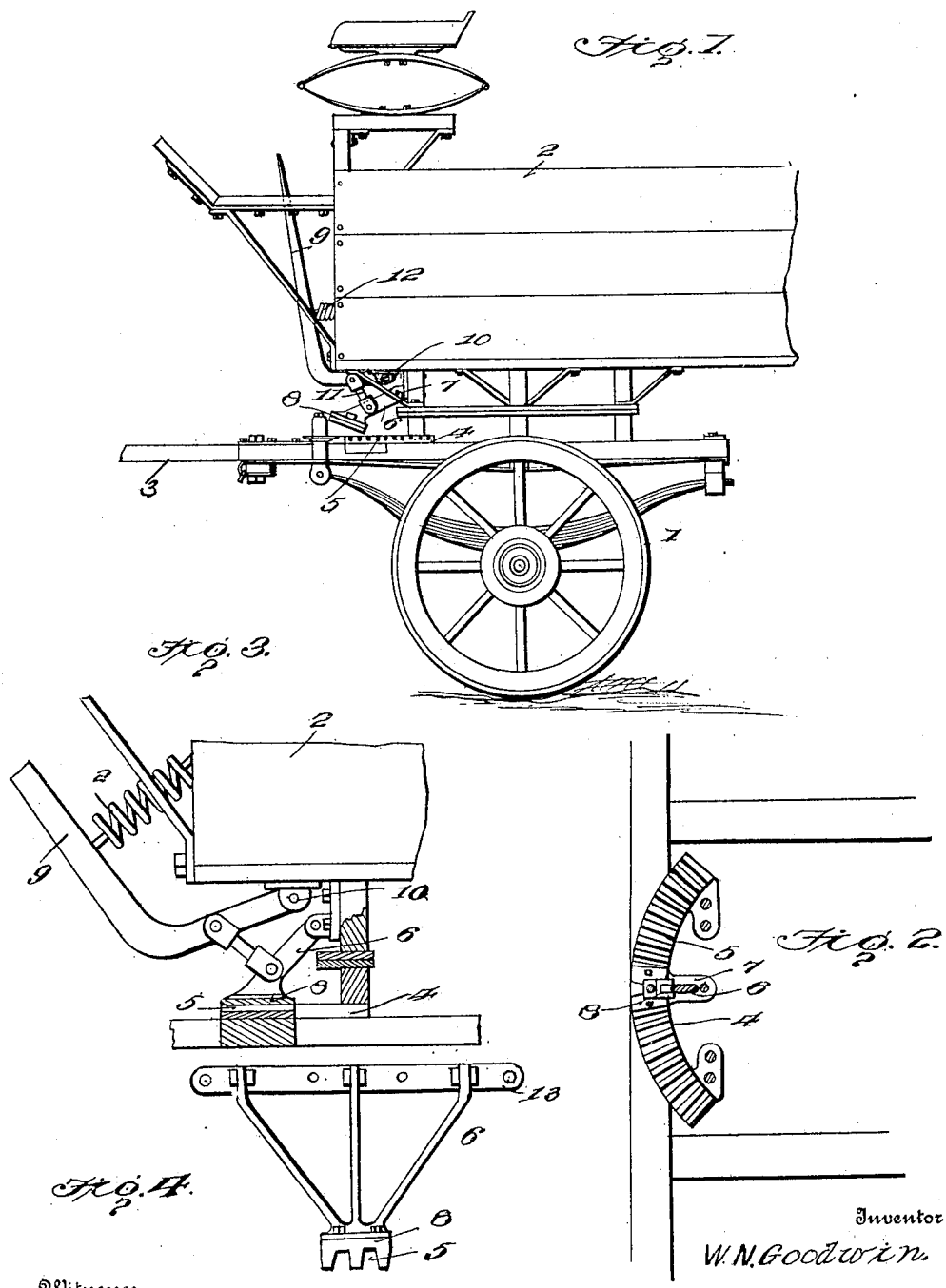
Inventor
W. N. Goodwin.

UNITED STATES PATENT OFFICE.

WILLIS N. GOODWIN, OF ALBUQUERQUE, TERRITORY OF NEW MEXICO.

LOCK FOR VEHICLE-TONGUES.

No. 906,525.  Specification of Letters Patent.  Patented Dec. 15, 1908.

Application filed January 21, 1908. Serial No. 411,948.

*To all whom it may concern:*

Be it known that I, WILLIS N. GOODWIN, citizen of the United States, residing at Albuquerque, in the county of Bernalillo, New Mexico Territory, have invented certain new and useful Improvements in Locks for Vehicle-Tongues, of which the following is a specification.

The present invention provides novel means for securing the pole or tongue of a vehicle in the desired adjusted position, thereby enabling the vehicle to be backed and not swerve from a direct line by the wheels striking an obstruction, or by the team becoming unruly.

The invention is designed for poles or tongues of four wheeled vehicles and such as have the fore truck connected with the body so as to turn about a vertical axis, the pole or tongue being attached to said truck and movable therewith to give proper direction to the vehicle.

The invention provides means under control of the driver to enable the tongue to be locked at will, so as to provide in effect a rigid connection between said tongue and the vehicle so that the latter may be backed a comparatively long distance without being diverged from a straight course either by the wheels striking an obstruction or by the team becoming fractious.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of the front portion of a four wheel vehicle equipped with locking means embodying the invention, for securing the pole or tongue in an adjusted position. Fig. 2 is a top plan view of a portion of the fore-truck frame, the toothed curved bar attached thereto and the latch, the latter being in horizontal section. Fig. 3 is a side view of the lower front portion of the vehicle body, a portion of the fore-truck and the lock means for the tongue. Fig. 4 is a front view of the latch and the plate by means of which it is attached to the bolster structure.

Corresponding and like parts are referred to in the following description and indicated in all the views of the drawings by the same reference characters.

The invention is adapted for vehicles in which the fore truck is adapted to turn horizontally about a vertical axis and to which truck the pole or tongue is attached, the component parts of the locking mechanism being attached to, respectively, the vehicle body or bolster structure thereof and to the truck or the pole and tongue.

The drawings illustrate a vehicle in which the fore truck 1 has a fifth wheel connection with the bolster structure applied to the bottom of the vehicle body 2. The pole or tongue 3 is connected to the framework of the truck 1 so as to move therewith. A curved bar or plate 4 is secured to the framework of the truck and is provided upon its upper side with a series of teeth 5 which are concentric with the axis about which the truck turns. A latch 6 has pivotal connection with the bolster structure of the vehicle body, being pivoted at 7 to the front member of the bolster structure. The pivoted latch 6 is provided at its front end with a head 8 which is toothed upon its lower side to match the teeth 5 of the bar or plate 4. Normally, the latch 6 is held out of engagement with the teeth of the bar or plate 5, thereby permitting the truck 1 to turn freely in the usual manner. When the front end of the latch 6 is lowered to cause the teeth of the head 8 to engage with the teeth 5 of the part 4, the truck, as also the pole or tongue 3, are locked, thereby providing in effect a rigid connection between the truck and the vehicle body. For operating the latch 6, an elbow lever 9 is provided and pivoted at 10 to the bottom of the body 2, a link 11 connecting the horizontal member of the lever 9 with the latch 6. The upper end of the lever 9 extends within convenient reach of the driver's seat to enable pressure of the foot to be exerted thereon when it is required to depress the latch 6 and cause the same to interlock with the teeth of the part 4. A retractile spring 12 connects the upright member of the lever 9 with the vehicle body, and serves to hold the latch 6 elevated or out of engagement with the part 4.

It will be understood from the foregoing that a vehicle equipped with means for locking the bolt or tongue may be operated in the usual manner, the fore truck being turned by moving the front end of the pole or tongue 3 to the right or to the left. When it is required to back in a straight line, the operator presses forward and downward upon the upper end of the lever 9, thereby bringing the latch 6 into interlocking engagement with the part 4 with the result that the pole 3 and truck 1 are locked or secured to the vehicle body, thereby preventing possible movement of the truck either by the wheels coming in contact with an obstruction or by the team moving to the right or to the left, hence the vehicle may be backed in a direct course which is of advantage, as will be readily comprehended.

The latch 6 consists of a middle and side members, the latter being oppositely inclined and forming braces for the middle member. The plate 13 to which the latch is pivoted has three pairs of lugs for the several latch members. The head of the latch, or that part provided with the teeth, is separable so as to be replaced when required for any purpose.

Having thus described the invention, what is claimed as new is:

In a vehicle, comprising a body, a truck having connection with the vehicle body to turn about a vertical axis, a fifth-wheel between the said truck and body, a pole projected from the truck, a toothed bar secured to the front portion of the truck and curved concentric with the axis thereof and independent of and exterior to the fifth-wheel, a latch comprising a middle and side members, the latter being diverged, said latch having a toothed head to coöperate with the curved toothed bar, a plate secured to the substructure of the body and provided with pairs of lugs to receive the several members of the latch which are pivoted thereto, and an operated lever having connection with said latch.

In testimony whereof I affix my signature in presence of two witnesses.

WILLIS N. GOODWIN.

Witnesses:
A. G. I. COOKE,
L. F. ROODHEAD.